United States Patent [19]

Luukkala et al.

[11] Patent Number: 4,833,928
[45] Date of Patent: May 30, 1989

[54] METHOD AND APPARATUS FOR NONCONTACTING TENSION MEASUREMENT IN A FLAT FOIL AND ESPECIALLY IN A PAPER WEB

[75] Inventors: Mauri Luukkala; Tapio Marttinen, both of Espoo, Finland

[73] Assignee: Strömberg Oy, Vaasa, Finland

[21] Appl. No.: 58,267

[22] Filed: Jun. 4, 1987

[30] Foreign Application Priority Data

Jun. 9, 1986 [FI] Finland ................................ 862446

[51] Int. Cl.$^4$ .............................................. G01L 5/10
[52] U.S. Cl. ............................... 73/862.39; 73/862.41; 73/655
[58] Field of Search ........... 73/862.41, 862.59, 862.39, 73/581, 597, 655, 159

[56] References Cited

U.S. PATENT DOCUMENTS

| | | | |
|---|---|---|---|
| 3,850,031 | 11/1974 | Schwenzfeier et al. | 73/159 X |
| 3,854,325 | 12/1974 | Coate | 73/597 |
| 3,854,329 | 12/1974 | Jones | 73/862.41 |
| 3,882,718 | 5/1975 | Kriebel | 73/655 X |
| 4,335,603 | 6/1982 | Locke | 73/581 X |
| 4,501,642 | 2/1985 | Wells | 73/159 X |
| 4,568,414 | 2/1986 | Oldis et al. | 73/862.41 X |

FOREIGN PATENT DOCUMENTS

| | | | |
|---|---|---|---|
| 3016878 | 11/1981 | Fed. Rep. of Germany | 73/655 |
| 62419 | 8/1982 | Finland | 73/862.41 |
| 566152 | 2/1977 | U.S.S.R. | 73/862.39 |
| 624157 | 9/1978 | U.S.S.R. | 73/597 |
| 672502 | 7/1979 | U.S.S.R. | 73/655 |

OTHER PUBLICATIONS

"An Absolute Method of Calibrating Ultrasonic Transducers Using Laser Interferometry"; Conference: Conference on the Evaluation and Calibration of Ultrasonic Transducers, London, England (11-12, May 1977), pp. 106-114; J. H. Speake.

*Primary Examiner*—Tom Noland
*Attorney, Agent, or Firm*—Birch, Stewart, Kolasch & Birch

[57] ABSTRACT

A method and apparatus for measuring the tension of a thin, plane membrane (1). In accordance with the method, a burst of a membrane wave (2) is generated by a transducer element (3) e.g. a loudspeaker (3). The velocity of the membrane wave (2) is measured. The velocity measurement value of the membrane wave (2) is squared and multiplied by the basis weight of the membrane (1) in order to determine the tension. According to the invention, a light beam (10) is generated by at least one light emitting element (5), each light beam (10) is projected with help of projecting members (6 or 14, 15, 17) onto the membrane (1) in order to generate a light spot (4 or 19), the light spot (4 or 19) vibrating on the membrane (1) is converted into an electrical signal dependent on the position of the light spot (19) by means of at least one detector element (8 or 18) in order to determine the membrane wave (2) and the signal is processed in a processor (9) in order to determine the velocity of the membrane wave (2). With help of the invention, the tension of a plane membrane (1) can be measured reliably without contact to the membrane.

13 Claims, 6 Drawing Sheets

METHOD AND APPARATUS FOR NONCONTACTING TENSION MEASUREMENT IN A FLAT FOIL AND ESPECIALLY IN A PAPER WEB

BACKGROUND OF THE INVENTION

1. Field of the Invention

This invention relates to a method for noncontacting tension measurement in a paper web.

Furthermore, the invention concerns an apparatus for the implementation of the method.

2. Description of Background Art

In paper and printing machinery, the measurement equipment for tension and distribution of tension in the paper web play an extremely decisive role in the reliability of machine operation. Web breaks are difficult to anticipate and cause considerable additional costs, especially since web speeds in paper mills are continually increasing with the web speed reaching 100 km/h. In this respect, a web tension measurement apparatus would be extremely necessary, especially if the distribution of tension could be measured in the cross direction of the machine because practical experience tells that the tension profile varies from very high peaks to fully slack valleys. If tension information is available as an electronic signal, the machine operation can be controlled accordingly, for instance, aiming to avoid web breaks. Today, the preferred methods are based on, for instance, control of rotation speed differences between the rolls, but owing to the slip, this control method of rotation speed is incapable of providing direct tension information from the web.

To date, tension measurement on a web is possible to accomplish by three different methods. The first method is based on blowing a dent on the web by compressed air and then measuring the dent depth. The second method measures the mutual pull force between the rolls by means of force transducers mounted to the shafts of the rolls. The third method utilizes membrane waves in the web, which are detected by microphones installed close to the web. The third method is described in more detail in FI patent publication 62 419. According to the patent, membrane waves are induced in the web by, e.g. a loudspeaker, which propagate in the direction of the applied tension in both the direction the paper is running as well as the counterdirection. The velocity of this membrane wave is then used in determining the web tension by a formula known in physics that expresses tension as proportional to the product of the membrane wave velocity squared and the basis weight of the web. The membrane wave velocity can be measured by microphones mounted at a predetermined distance from the sound source and thereby determining the propagation time of the membrane wave. This method applies vibrations of the acoustic frequency range, such as bursts of 400 Hz frequency. A method based on the use of membrane waves is also described in U.S. Pat. No. 3,854,329. Different from the Finnish method, this publication discloses a method based on the use of ultrasonic vibrations.

The first method compressed air blowing has proved rather inaccurate. In addition, because the method requires the nozzle to be applied very close to the paper web, the hazard of tearing is high.

The second method based on the measurement of mutual pull force between the rolls is relatively commonly used but its disadvantages are, for instance, slow response because the roll masses may be up to hundreds of kilograms. Actually, the method measures the equivalent of tension integrated over the entire width of the web, which leaves, for instance, the tension profile undefined. Furthermore, the tension peaks that break the web remain undetected.

In the third method in accordance with the FI patent, owing to the audio-frequency signal, the microphones, too, must be tuned to the same frequency range, which induces considerable signal-to-noise problems because, as known, the surroundings of a paper machine contain extremely high acoustic noise especially in this frequency range, causing e.g., overload of microphones. In addition, the detection of a burst signal by microphones also detects the direct acoustic signal from the loudspeakers via air, which causes heavy disturbance to the measurement. On the other hand, the practical tests of the method indicate that membrane waves are not capable of propagating in the ultrasonic frequency range, which makes an apparatus described in the US patent impossible to operate.

SUMMARY AND OBJECT OF THE PRESENT INVENTION

The aim of the present invention is to overcome the disadvantages associated with the prior art technology described above and to achieve an entirely novel method and apparatus for a noncontacting measurement of tension on a paper web.

The invention is based on a membrane wave, generated at an appropriate frequency on the paper web with a loudspeaker or an equivalent device, while the wave propagation velocity is detected with optical detectors mounted close to the web for detection of the physical vibration of the web when the membrane wave passes the observation point. As the distance of the optical detection point from the origin of the wave is known, the wave velocity can be exactly computed from the measured propagation time. In practice, one uses two optical detection points whose mutual distance is known.

More specifically, the method in accordance with the invention is characterized by projecting a light beam onto a membrane and providing at least two detectors for determining the membrane wave and processing a signal for determining the velocity of the membrane.

Furthermore, the apparatus in accordance with the invention is characterized by a light beam projected onto the membrane and at least two detectors for determining the membrane wave and a processing unit for processing a signal and determining the velocity of the membrane.

The invention provides outstanding benefits. The method and apparatus in accordance with the invention eliminates all environmental noise disturbances and direct sound from the loudspeaker. The optical detection method thus considerably improves the signal-to-noise ratio and makes the use of the apparatus possible even in such circumstances where the prior art method would be totally useless.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
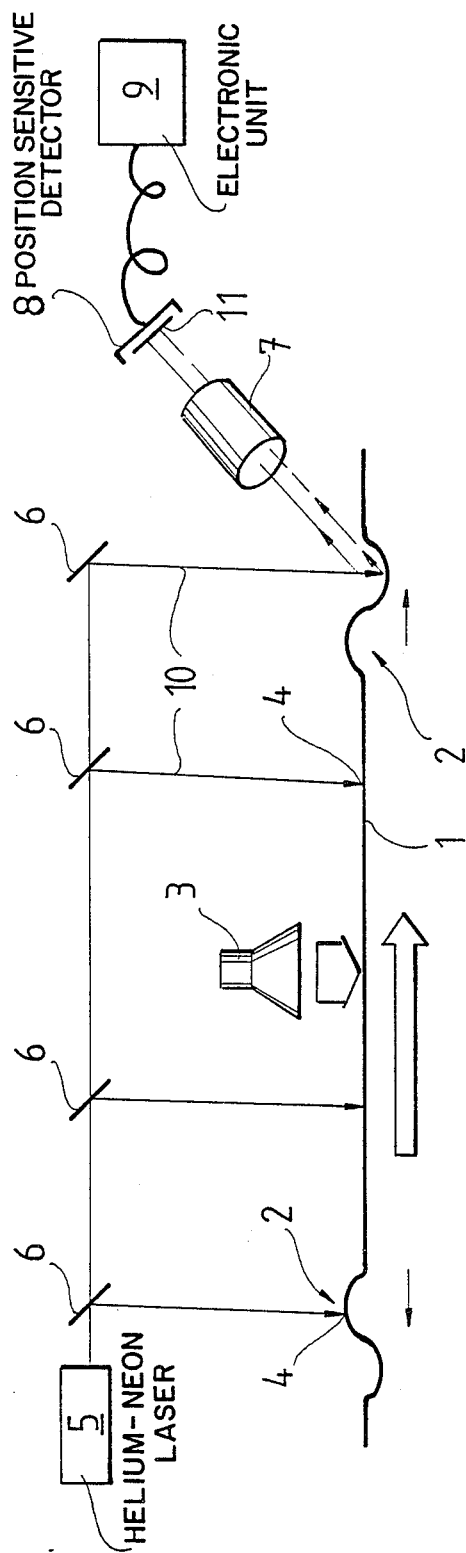
FIG. 1 shows in a partially schematic side view a measurement apparatus in accordance with the invention.

FIG. 1 shows a possible embodiment for the implementation of an apparatus in accordance with the invention. With help of a helium-neon laser 5 and semireflective mirrors, vibrating light spots 4 are formed on a paper web 1 by aiming the laser beam with mirrors 6 perpendicular to the surface of the paper web 1. A loudspeaker 3 is used for generating a sound burst which induces on the paper web 1 a membrane wave 2, which propagates at a velocity relative to the square root of web tension. The membrane wave 2 propagates outwardly from the loudspeaker 3 at both sides of the sound source 3. The position of the vibrating light spots 4 on the web is detected by a position-sensitive detector 8, whose optical axis forms an angle with a beam 10 focused on the web, and the light spot 4 is focused on the detector 8 by means of an appropriate optical system 7.

Figure 2:
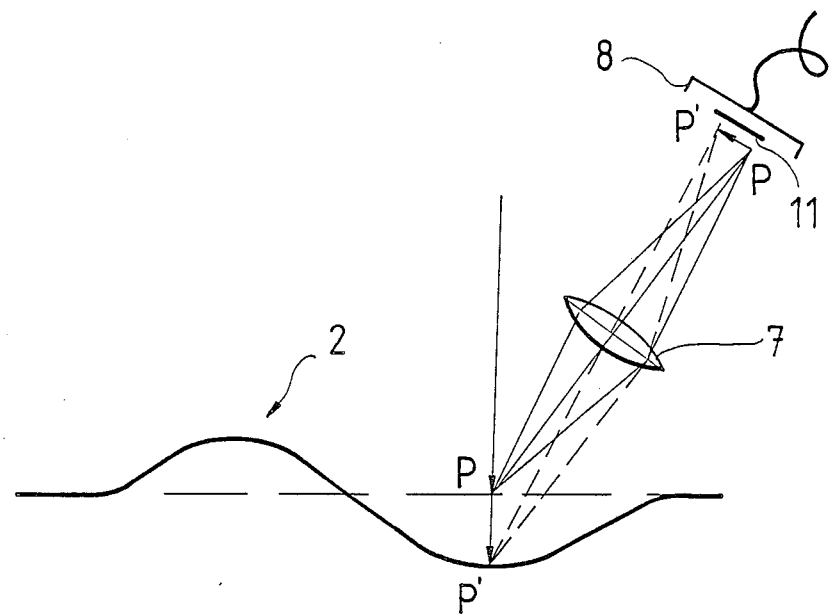
FIG. 2 illustrates a detail of the measurement apparatus shown in FIG. 1.

FIG. 2 illustrates in more detail the imaging of light spots p and p' into image spots P and P' onto an image plane 11. When the web 1 is displaced by the vibration from its equilibrium position p to a new position p', the position of the image spot P is simultaneously displaced on the image plane 11 to the position P'. The position-sensitive detector 8 detects the movement of the light spot 4, caused by the membrane wave 2, as a periodical signal, whose frequency is the same as the frequency of the membrane wave 2. The displaced image spot is shown in the figures by a dashed line.

The output signal of the position-sensitive detector 8 is applied to an electronic unit 9, where the obtained signal is used for determining the propagation velocity of the membrane wave 2, from which the tension of the web 1 can be computed.

In the simplest embodiment, the velocity of the wave 2 can be defined with help of one detector 8. This requires information obtained from the web speed. The wave velocity can be measured from the ratio of the distance between the sound source 3 and the detector 8 to the propagation time of the wave 2 over this distance.

Figure 7:
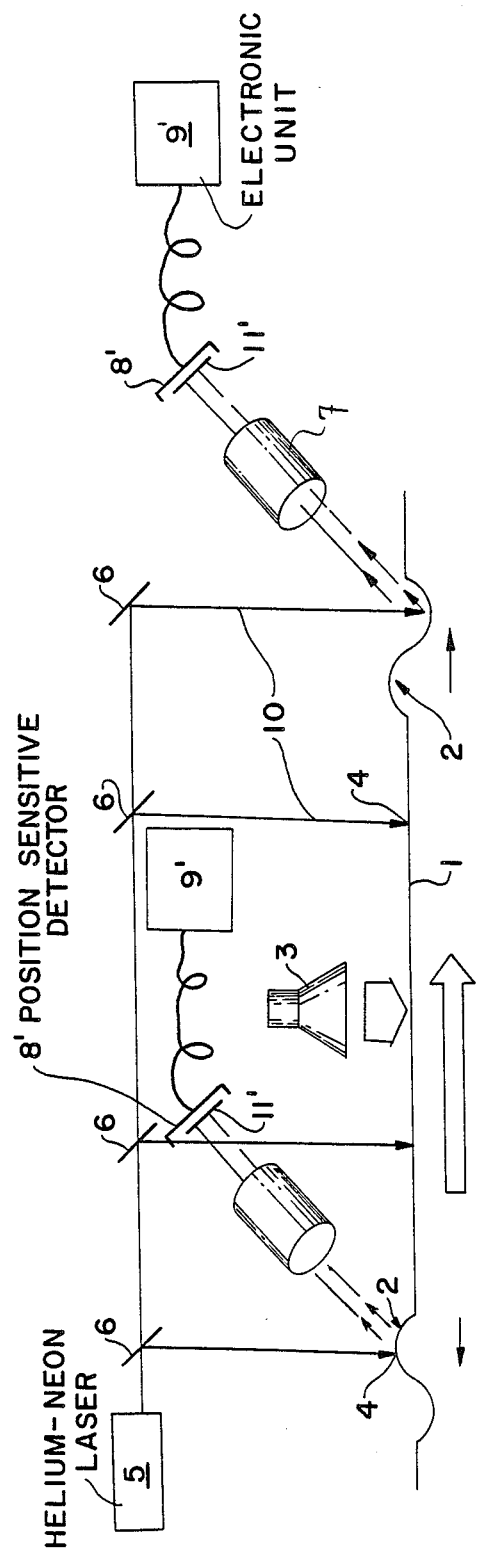
FIG. 7 in a partially schematic side view a measurement apparatus including two position sensitive detectors.

FIG. 7 is similar to the arrangement as illustrated in FIG. 1 and similar elements are identified by the same reference numerals. FIG. 7 shows the mirror arrangements, which provide a total of four light spots 4 onto the web 1. As illustrated in FIG. 7, by using a second detector arrangement of two detectors 8' in conjunction with the light spot 4 closest to the laser 5, additional benefits are gained. Now, membrane waves 2 propagating in opposite directions can be detected. By measuring the velocities of both waves 2 in the aforementioned manner and forming the arithmetic mean of these velocities, the effect of the speed of web 1 can be eliminated in the measurements. FIG. 7 includes optical systems 7', image planes 11' and electronic units 9' arranged in a similar manner as the elements illustrated in FIG. 1.

Figure 3:
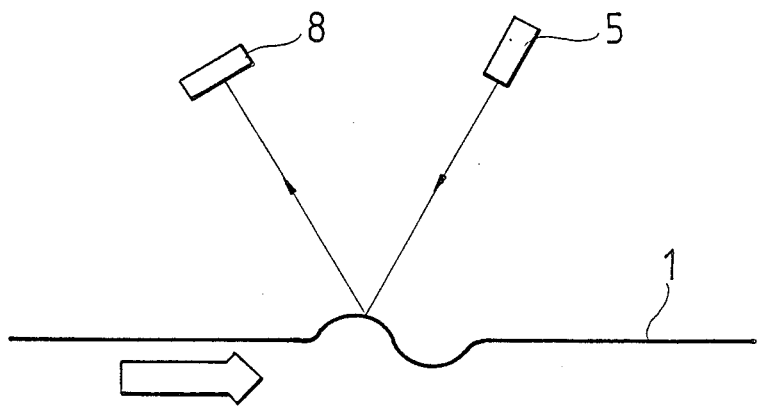
FIG. 3 shows in a schematic side view another embodiment of the measurement apparatus in accordance with the invention.

FIG. 3 shows an arrangement in which the light beam is aligned obliquely from the light source 5 to the paper web 1, and also the optical axis of the position-sensitive detector 8 is oblique to the paper web 1. In practice, the angle of the optical axis of both the light source 5 and the detector 8 to the paper web 1 can be selected over a large range according to circumstances.

Figure 4:
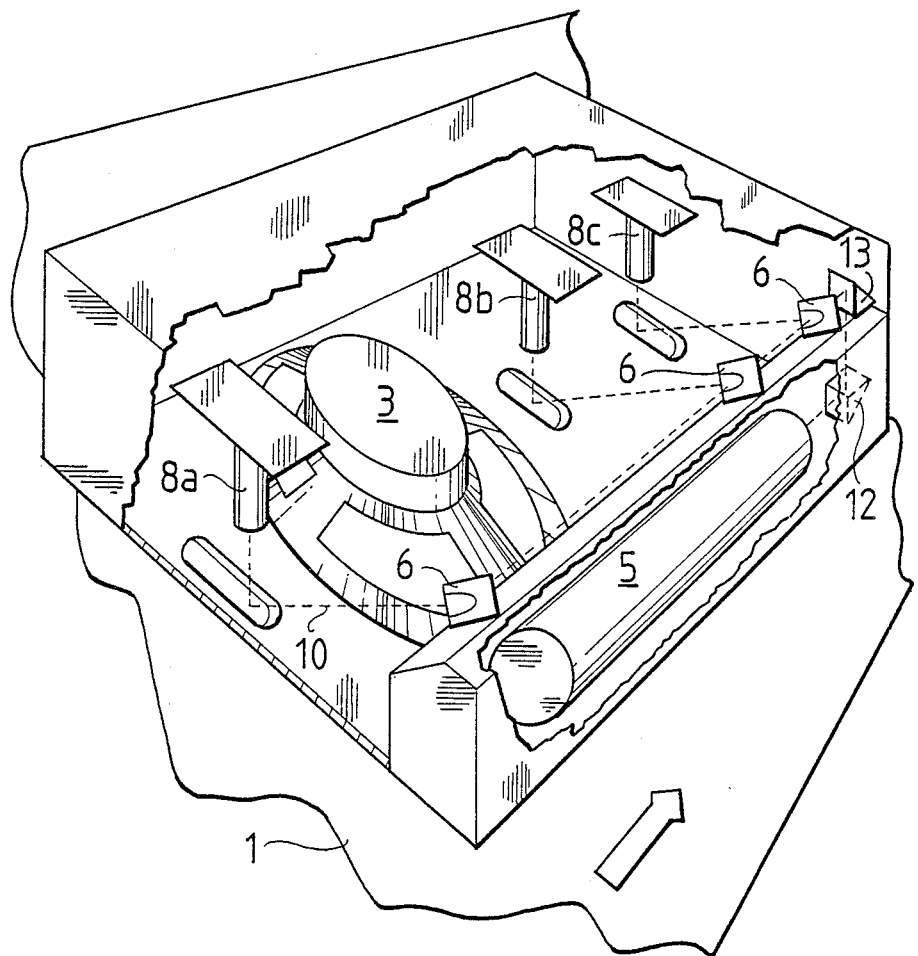
FIG. 4 shows a partially exposed perspective view a third embodiment of the measurement apparatus in accordance with the invention.

FIG. 4 shows an apparatus in which three light spots 4 are formed on the web 1 so that the laser 5 first generates a light beam which is guided via a first prism 12 and a second prism 13 to the three semireflective mirrors 6. The mirrors 6 align the light beam 10 in an oblique angle to the surface of the paper web 1. The loudspeaker 3 generates a membrane wave 2 on the paper web 1. The wave 2 causes a vertical displacement of web 1, which further induces a horizontal displacement of the light spot 4. The deflection is detected by a position-sensitive detector 8, which also incorporates the required optics for focusing the light spot 4 onto the detector sensor. There are three detectors 8 with the optical axis of each detector aligned perpendicular to the paper web 1. The detectors 8 are placed so that they are on the same line in relation to the machine direction of the paper web 1, and one detector 8a is located in the approaching direction of the web 1 in relation to the loudspeaker 3 and the two other detectors 8b, 8c in the receding direction of the web in relation to the loudspeaker 3. With help of detectors 8a and 8b, this arrangement is capable of eliminating the effect of the web 1 speed on the measurement result in the manner described above. The detector 8c functions in cooperation with detector 8b so that a correlation method known in mathematics can be utilized for determining the velocity of the membrane wave. In the method, the membrane wave 2 propagating in the travelling direction of the web 1 from the loudspeaker 3 generates a signal in the detector 8b.

After a while, the detector 8c detects the same (or almost the same) signal. Both signals are stored in a memory, e.g. a solid state memory. As described above, the memory units thus record two time-dependent functions, almost similar to their shape. A cross-correlation function is then formed from the functions by using, for instance, a computer. The ratio of the distance between the detectors 8b and 8c to the time shift T obtained from the correlation function results in the wave velocity (uncorrected for the web speed) of the membrane wave 2. The described method is especially advantageous when the wave shape of the membrane wave is disturbed, in which case simpler methods are ineffective.

Figure 5:
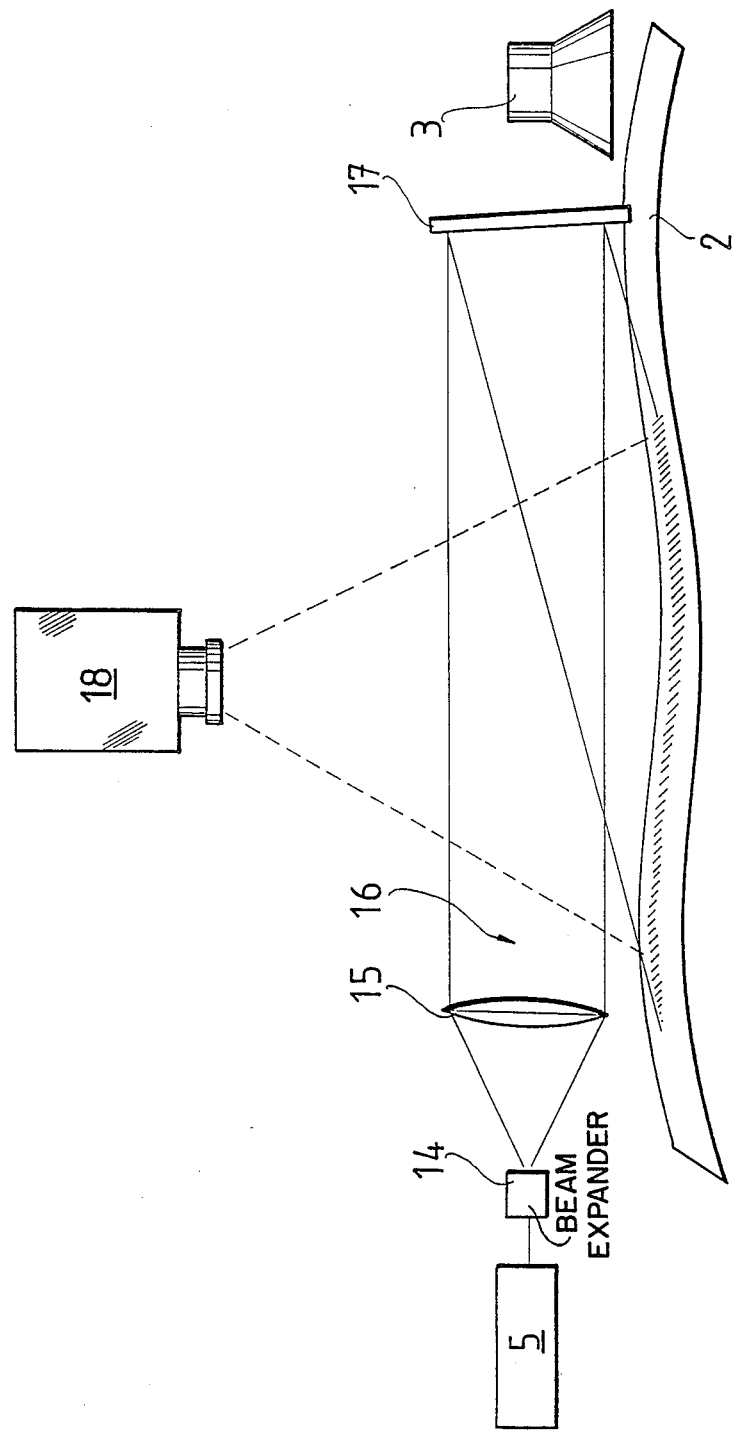
FIG. 5 shows in a side view a fourth embodiment of the measurement apparatus in accordance with the invention, in which the membrane wave is made visible with help of an interference-generating glass plate.
Figure 6:
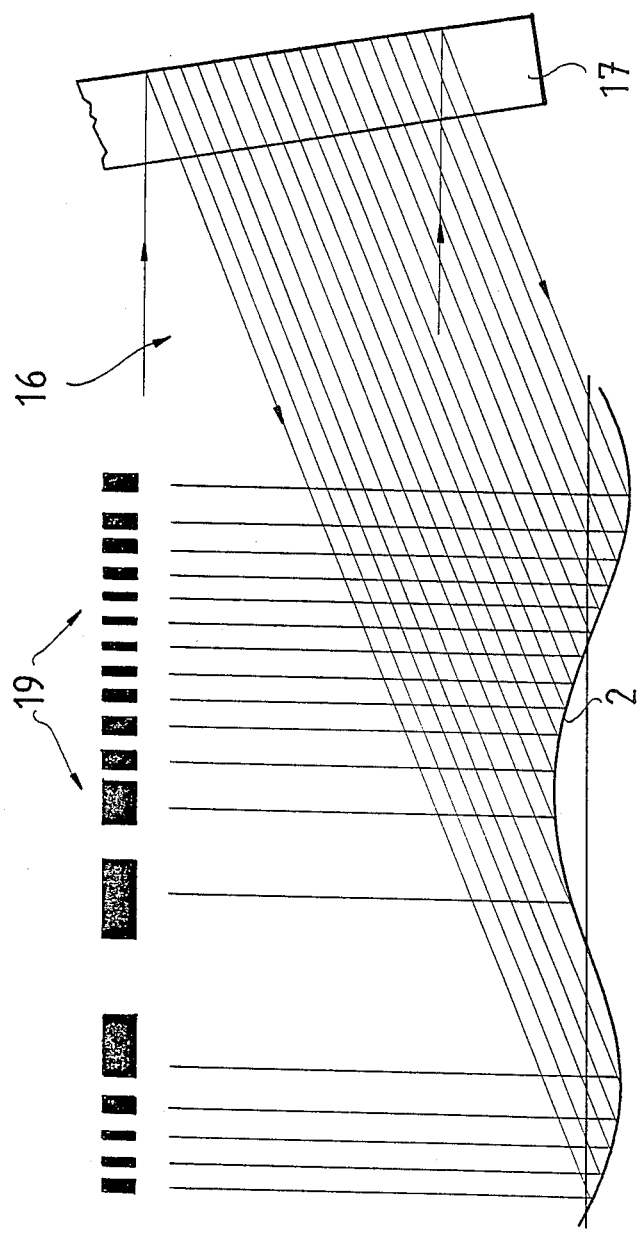
FIG. 6 illustrates a detail of the apparatus shown in FIG. 5.

FIGS. 5 and 6 show an alternative implementation in which the light generated by a laser 5 is expanded by a beam expander 14 and collimated by condenser lens 15 into a coherent plane wave 16. The plane wave 16 is incident on a wedge-shaped polished glass plate 17, where the plane wave, when reflecting from each surface of the glass plate 17, is composed to a comb-like interference pattern 19, as illustrated in FIG. 6, which is projected obliquely onto the paper web 1. Now the variations of surface appear as minima and maxima of the projected interference pattern, which can be detected by, for instance, a row camera 18.

The helium-neon laser as the light source in the embodiments of FIGS. 1, 2 and 3 can be replaced by, for instance, a high-power LED lamp (solid-state emitter or an equivalent light source) which is small in size and whose light can be focused into a sufficiently small spot onto the paper web 1. However, the method for generating a small light spot is nonessential to this invention and does not incorporate novelty in the invention. Furthermore, position-sensitive detectors are commercially available and, therefore, their characteristics are not described here in more detail. The sound source used can be, for instance, a loudspeaker, a compressed air whistle pipe or the equivalent. These alternatives are standard solutions because the used frequencies are in the order of 100 . . . 500 Hz.

In addition to paper web tension, the present invention can be used for measuring tension in other thin foil materials. The measurement apparatus is especially applicable to measuring tension in very thin plastic films and metal foils.

The advantage of the method is that, according to the physical formula used, the modulus of elasticity (Young's modulus) of the material has no influence on the measurement but rather the velocity of the membrane wave is only dependent on the basis weight of the membrane used and the web tension.

In addition to use in paper machines, the measurement apparatus can be used in length shears, sizing presses and printing machines. Furthermore, the invention can be applied to machines intended for the production of plastic-based magnetic tapes or for very thin metal foils.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for measuring a tension of a thin, plane membrane comprising the following steps:
   generating a burst of a membrane wave by a transducer element;
   generating a light beam by at least one light emitting element;
   splitting the light beam into a plurality of light beams;
   aligning each light beam by alignment members on the membrane for generating light spots;
   converting the light spots formed on the membrane into an electrical signal dependent on the position of the light spots by means of at least two detector elements in order to determine the membrane wave; and
   processing the signal in a processor element in order to determine the velocity of the membrane wave;
   determining the tension of the membrane by squaring the velocity measurement value of the membrane wave and multiplying by the basis weight of the membrane.

2. A method in accordance with claim 1, characterized in that the at least one light emitting element (5) is a laser.

3. A method in accordance with claim 1, characterized in that the at least one light emitting element (5) is a light-emitting diode.

4. A method in accordance with any of claims 1, 2 or 3, characterized in that each light beam (10) is projected approximately perpendicular to the plane of the membrane (1) in order to detect the position of the light spots (4) in a vertical plane by means of said at least two detector elements.

5. A method in accordance with any of claims 1, 2 or 3, characterized in that each light beam (10) is projected obliquely to the plane of the membrane (1) in order to detect the deflection of the light spots (4) by means of said at least two detector elements.

6. A method in accordance with claim 1, characterized in that said at least one light emitting element is a solid state emitter.

7. An apparatus for measuring a tension of a thin, plane membrane comprising:
   a transducer member for generating a burst of a membrane wave;
   at least one light emitting element for generating a light beam;
   projection members for projecting the light beam onto the membrane for producing light spots;
   at least two detector elements for converting the light spots formed on the membrane into an electrical signal dependent on the position of the light spots; and
   a processor for processing the electrical signal for determining the velocity of the membrane wave.

8. An apparatus in accordance with claim 7, characterized in that a laser is used as the at least one light emitting element (5).

9. An apparatus in accordance with claim 7, characterized in that the at least one light emitting element (5) is a light-emitting diode.

10. An apparatus according to claim 1, characterized in that said at least one light emitting element is a solid state emitter.

11. A method for measuring a tension of a thin, plane membrane comprising the following steps;
   generating a burst of a membrane wave by a transducer element;
   generating a light beam by at least one light emitting element;
   expanding the light beam emitted from the laser by a beam expander and collimating by a condenser lens for generating a coherent plane wave which is projected onto an interference-generating wedge-shaped glass plate for projecting the light subjected to interference thereby onto the membrane;
   generating an electrical signal from an interference pattern formed on the web membrane resulting from the use of the interference generating means by a row camera;
   processing the signal in a processor element in order to determine the velocity of the membrane wave; and
   determining the tension of the membrane by squaring the velocity measurement value of the membrane wave and multiplying by the basis weight of the membrane.

12. An apparatus for measuring a tension of a thin, plane membrane comprising:
- a transducer element for generating a membrane wave;
- at least one light emitting element for generating a light beam;
- a light beam expander and a condenser lens for producing a coherent plane wave;
- an interference generating means for projecting the light subjected to interference thereby onto the web membrane; and
- a row camera for generating an electrical signal from an interference pattern formed on the web membrane resulting from the use of the interference generating means.

13. An apparatus in accordance with claim 12, characterized in that the interference generating means is a wedge-shaped glass.

* * * * *